United States Patent
He

(10) Patent No.: US 10,996,845 B2
(45) Date of Patent: May 4, 2021

(54) METHOD, APPLICATION, BROWSER, AND ELECTRONIC DEVICE FOR PROVIDING WEBPAGE CONTENT

(71) Applicant: Alibaba Group Holding Limited, Grand Cayman (KY)

(72) Inventor: Weijia He, Guangzhou (CN)

(73) Assignee: Alibaba Group Holding Limited, George Town (KY)

(*) Notice: Subject to any disclaimer, the term of this patent is extended or adjusted under 35 U.S.C. 154(b) by 67 days.

(21) Appl. No.: 15/468,229

(22) Filed: Mar. 24, 2017

(65) Prior Publication Data

US 2017/0277422 A1 Sep. 28, 2017

(30) Foreign Application Priority Data

Mar. 25, 2016 (CN) .......................... 201610176355.5

(51) Int. Cl.
*G06F 3/0488* (2013.01)
*G06F 3/0484* (2013.01)
*G06F 3/0483* (2013.01)
*H04L 29/08* (2006.01)

(52) U.S. Cl.
CPC ........ *G06F 3/04883* (2013.01); *G06F 3/0483* (2013.01); *G06F 3/0484* (2013.01); *G06F 3/0488* (2013.01); *H04L 67/02* (2013.01)

(58) Field of Classification Search
CPC .. G06F 3/04883; G06F 3/0482; G06F 3/0483; G06F 3/0488; G06F 3/0484
See application file for complete search history.

(56) References Cited

U.S. PATENT DOCUMENTS

| 5,941,957 A * | 8/1999 | Ingrassia, Jr. ....... G06F 11/3495 707/E17.111 |
| 9,075,882 B1 * | 7/2015 | Ward ................. G06Q 30/0631 |
| 10,552,488 B2 * | 2/2020 | Pennacchiotti ........ G06Q 50/01 |
| 2005/0012723 A1 * | 1/2005 | Pallakoff ............... G06F 1/1616 345/173 |
| 2008/0114773 A1 * | 5/2008 | Choi ..................... G06F 16/951 |
| 2009/0150539 A1 * | 6/2009 | Epling ................... G06Q 30/02 709/224 |

(Continued)

FOREIGN PATENT DOCUMENTS

| CN | 102810101 A | 12/2012 |
| CN | 103577478 A | 2/2014 |

(Continued)

OTHER PUBLICATIONS

Office Action for Chinese Application No. 201610176355.5 dated Nov. 1, 2019, 12 pages.

(Continued)

*Primary Examiner* — Tadesse Hailu
(74) *Attorney, Agent, or Firm* — Alston & Bird LLP

(57) ABSTRACT

In accordance with various embodiments of the present disclosure, a method, an application, a browser, and an electronic device for providing webpage content are provided. In some embodiments, the method comprises: detecting a sliding action of a user when a first content webpage is displayed, and providing a second content webpage based on the detection, wherein the second content webpage is a new content webpage obtained based on the first content webpage.

19 Claims, 4 Drawing Sheets

(56) References Cited

U.S. PATENT DOCUMENTS

| | | | |
|---|---|---|---|
| 2010/0214237 A1* | 8/2010 | Echeverri | G06F 3/04883 345/173 |
| 2011/0022957 A1* | 1/2011 | Lee | G06F 3/0485 715/702 |
| 2011/0138267 A1* | 6/2011 | Yi | H04M 1/72561 715/234 |
| 2012/0311429 A1* | 12/2012 | Decker | G06F 17/2247 715/234 |
| 2013/0031459 A1* | 1/2013 | Khorashadi | G06F 16/9577 715/234 |
| 2013/0145290 A1* | 6/2013 | Weber | G06F 3/0483 715/760 |
| 2013/0166975 A1* | 6/2013 | Son | G06F 21/79 714/727 |
| 2013/0305159 A1* | 11/2013 | Kim | G06F 17/30876 715/738 |
| 2014/0258846 A1* | 9/2014 | Shin | G06F 3/14 715/234 |
| 2014/0327677 A1* | 11/2014 | Walker | G06T 11/206 345/440 |
| 2014/0365956 A1* | 12/2014 | Karunamuni | G06F 3/04847 715/788 |
| 2014/0380144 A1* | 12/2014 | Liang | G06F 40/166 715/234 |
| 2015/0089439 A1* | 3/2015 | Wada | G06F 3/0481 715/784 |
| 2015/0109221 A1* | 4/2015 | Wang | G06F 3/0488 345/173 |
| 2015/0127627 A1* | 5/2015 | Wo | G06F 16/9535 707/706 |
| 2016/0054867 A1* | 2/2016 | Lee | G06F 3/0482 715/778 |
| 2016/0357305 A1* | 12/2016 | Wells | G06F 3/04842 |
| 2018/0032997 A1* | 2/2018 | Gordon | G06Q 20/3224 |

FOREIGN PATENT DOCUMENTS

| | | |
|---|---|---|
| CN | 104090944 A | 10/2014 |
| CN | 104272306 A | 1/2015 |
| CN | 105094627 A | 11/2015 |

OTHER PUBLICATIONS

Search Report for Chinese Application No. 201610176355.5 dated Oct. 23, 2019, 2 pages.

* cited by examiner

METHOD, APPLICATION, BROWSER, AND ELECTRONIC DEVICE FOR PROVIDING WEBPAGE CONTENT

CROSS-REFERENCES TO RELATED APPLICATIONS

This application claims the priority of Chinese Patent Application No. 201610176355.5, filed on Mar. 25, 2016, the entire content of which is incorporated herein by reference.

FIELD OF THE DISCLOSURE

The present disclosure generally relates to the field of webpage content providing technology and, more particularly, relates to a method, an application, a browser, and an electronic device for providing webpage content.

BACKGROUND

With the continuous popularity and development of the mobile phones and other electronic devices, using a browser operated on an electronic device to access the Internet has become a trend. In small-sized electronic devices such as mobile phones, the webpage content display is also increasingly diverse. More and more information can be browsed through various webpages.

In general, users want to browse webpages quickly and easily for obtaining more content. Under the current technologies, a user has to make relatively complicated operations for obtaining webpage content. Taking a portal news website as an example, a user's browsing process can briefly include the following steps: a browser can be first started; then a portal news website home page can be accessed; next, a specific news webpage can be entered and; finally, the specific news webpage can be read by the user. If the user wants to browse other related content, the user may have to return to the home page of the portal news website, and then continue to search for the content on the home page of the portal news website.

However, when reading these news webpages, in order to obtain more content, users usually want to be able to quickly browse the webpage content and frequently switch the webpage content. With the current technique, since it is necessary to return to the home page to perform a further search, an obtaining path for new content can be relatively complicated, resulting in a poor user experience. Especially for mobile phones, tablet computers, and other small electronic devices, such frequent user interactions may seriously affect the users' reading experience.

Therefore, a new content webpage content obtaining technique is desired for providing a fast presentation of to-be-browsed webpage content to a user, thereby improving the user's reading experience. Accordingly, the disclosed methods and systems are provided to at least partially alleviate one or more problems set forth above and to solve other problems in the art.

BRIEF SUMMARY OF THE DISCLOSURE

In accordance with some embodiments of the present disclosure, a method, an application, a browser, and an electronic device for providing webpage content are provided.

An aspect of the present disclosure provides a method for providing content webpage, comprising: detecting a sliding action of a user when a first content webpage is displayed; and providing a second content webpage based on the detection, wherein the second content webpage is a new content webpage obtained based on the first content webpage.

In some embodiments, the first content webpage is a news webpage; and the second content webpage is a news webpage, or includes a list of news.

In some embodiments, the sliding action is a sliding on a screen of an electronic device towards a left direction.

In some embodiments, the second content webpage is provided when a parameter obtained based on the detection reaches a predetermined threshold value.

In some embodiments, the parameter includes a path length of the sliding action.

In some embodiments, the parameter includes and a speed of the sliding action.

In some embodiments, providing the second content webpage based on the detection includes: requesting the second content webpage from a server; and receiving the second content webpage from the server.

In some embodiments, the second content webpage is a content webpage recommended to the user.

In some embodiments, the second content webpage is a pre-read content webpage.

In some embodiments, a domain name of the second content webpage is different from a domain name of the first content webpage.

Another aspect of the present disclosure provides an application for providing content webpage, comprising: a detecting module for detecting a sliding action of a user when a first content webpage is displayed; and a providing module for providing a second content webpage based on the detection, wherein the second content webpage is a new content webpage obtained based on the first content webpage.

Another aspect of the present disclosure provides a browser, comprising a disclosed application.

Another aspect of the present disclosure provides an electronic device, comprising: a memory and a processor; wherein the memory is configured for storing instructions for controlling the processor to perform the disclosed method.

In some embodiments, the electronic device comprises: a receiving module configured for receiving webpage data of a first content webpage from a network; a touch screen configured for detecting a signal of sliding on the touch screen; and a processor configured for detecting a sliding action of a user based on the signal from the touch screen when the first content webpage is displayed on the touch screen, and providing a second content webpage based on the detection, wherein the second content webpage is a new content webpage obtained based on the first content webpage.

Other aspects of the present disclosure can be understood by those skilled in the art in light of the description, the claims, and the drawings of the present disclosure.

BRIEF DESCRIPTION OF THE DRAWINGS

Various objectives, features, and advantages of the present disclosure can be more fully appreciated with reference to the detailed description of the present disclosure when considered in connection with the following drawings, in which like reference numerals identify like elements. It should be noted that the following drawings are merely examples for illustrative purposes according to various

DETAILED DESCRIPTION

Figure 1:
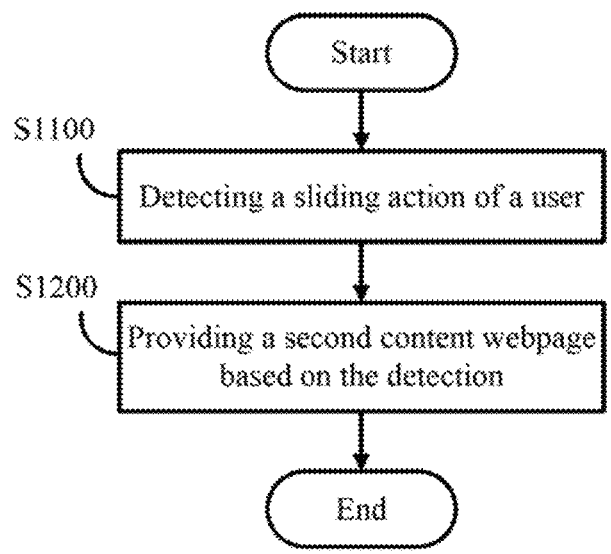
FIG. 1 illustrates a flowchart of an exemplary method for obtaining webpage content in accordance with some embodiments of the present disclosure.

Reference input now be made in detail to exemplary embodiments of the invention, which are illustrated in the accompanying drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

It should be noted that, the relative arrangement, numerical expression and numerical values of the components and steps set forth in the disclosed embodiments, unless otherwise specified, do not limit the scope of the present invention.

The following description of at least one exemplary embodiment is in fact merely illustrative and is in no way intended as a limitation on the present invention, its application, or its use.

The techniques, methods, and devices known to those of ordinary skill in the relevant art may not be discussed in detail, but such techniques, methods, and devices should be considered as part of the specification, as appropriate.

In all examples shown and discussed herein, any specific value may be construed as merely exemplary and not as limiting. That is, other examples of exemplary embodiments may have different values.

It should be noted that like reference numerals and letters designate like items in the following drawings and, therefore, once an item is defined in one of the drawings, it may be unnecessary to further discuss it in the subsequent figures.

In accordance with various embodiments, the present disclosure provides a method, an application, a browser, and an electronic device for providing webpage content. Various embodiments consistent with the present disclosure are described with reference to the drawings in the following.

Referring to FIG. 1, a flowchart of a method for obtaining webpage content is shown in accordance with some embodiments of the present disclosure.

When a user using an electronic device starts a browser to access a website for browsing webpage content, the disclosed method shown in FIG. 1 can allow the user to read the webpage content more fluently, which can improve the user's reading experience. In some embodiments, the electronic device may be a mobile phone, a tablet computer such as an iPad, or any other suitable electronic device.

As shown in FIG. 1, at step S1100, a sliding action can be detected when a first content webpage is displayed. The sliding action may be performed by the finger tip of the user, or the sliding action may be performed by a stylus tip used by the user.

The first content webpage is a webpage that the user is currently reading. For example, the user may input a webpage address in a browser of the electronic device to directly access the first content webpage. Optionally, the user may also access the first content webpage through a home page of a portal news website.

It should be noted that, the terms of "first" and "second" described in the present specification are for clarity of description and are used to distinguish between different webpages, and are not limited to the order or other webpage relationships. In one example, the first content webpage can be a news webpage.

When the user finishes browsing the first content webpage, the user can perform a sliding action or the like to enter a next webpage. The sliding action may be a sliding of a finger tip on a touch screen of the electronic device. It should be understood by those skilled in the art that, the sentence of "a sliding action can be detected" has indicated that the electronic device to which the disclosed method is applied has a component for performing such detection, such as a touch screen or any other motion detection sensor.

The sliding action can slide towards left or towards right. Generally, a user is more likely to swipe from right to left when looking for a next webpage. Thus, in one example, the sliding is towards a left direction. That is, the sliding action is from a right-to-left direction.

At step S1200, a second content webpage can be provided based on the detection. The second content webpage is a new content webpage obtained based on the first content webpage.

It should be understood by those skilled in the art that, the term "new content webpage" as used herein refers to a webpage newly acquired on the basis of the first content webpage, rather than a webpage that the user has browsed before and can be accessed again by controlling the forward and backward actions. In other words, at least one webpage, which is different from the webpages that the user has browsed before, can be found in the webpages newly acquired by the disclosed method of such embodiments. The content of the new content webpage may or may not be related to the content of the first content webpage.

For example, the second content webpage may be a content webpage recommended to a user. The second content webpage may have various forms. For example, the second content webpage can be a news webpage. Optionally, the second content webpage includes a list of news.

In some embodiments, the domain name of the second content webpage may be different from the domain name of the first content webpage. For example, the content webpage recommended to the user may not be limited to other webpages under the same website, but may also be related content webpages of other websites. As such, it is possible to expand the range of the content webpage recommended to the user, thereby providing the user with richer content and increasing the user's reading interest.

In some situations, the user's sliding actions may be random, and the purpose of the user's sliding actions may not be to search for relevant content webpages. Therefore, in order to increase the correctness of detection, a predetermined threshold value may be provided in some embodiments. The second content webpage can be provided when a parameter obtained based on the detection reaches the predetermined threshold value. The threshold value may be pre-determined by using statistical data of browsing habits of the user, or may be dynamically adjusted in accordance with different browsing behaviors to different types of webpages by the user. The parameters can reflect an intent of the user to acquire a new content webpage, which may be a composite evaluation value for one or more operations of the user. In one example, the parameters may include at least one of a path length and a speed of the user's sliding action.

The second content page may be pre-stored in the electronic device. Alternatively, the electronic device can request the second content webpage from a server, and receive the second content webpage from the server. The server can determine the second content webpage based on the webpage content that the user is currently browsing, and can send the second content webpage to the electronic device of the user.

Users often want to browse new webpages sequentially, rather than returning to a specific node to select a new webpage every time when a browsing of one webpage is finished. Such frequent return operation may block the user's browsing fluency, and in some situations, may annoy the user. In order to cope with this situation, a variety of solutions can be applied. For example, a node webpage with a list of content webpages can be kept, and each content webpage can be opened in a new browsing window. As such, the user does not have to reload the node webpage for browsing a new content webpage. For example, a suspended window including a list of content webpages may be provided.

The above described embodiments of the disclosed method provide a different solution than the current solutions. By sliding a finger tip on the touch screen, a user can browse the new content webpage fluently. With the technical solution of the above described embodiments, users do not need to return to a specific page to acquire other content, which can shorten the path to acquire content. Thus, the users can quickly get more content, which can improve users' reading experience.

Particularly in the case of news webpages, user's browsing can be smoother, and the annoying requirement of frequent implementations of the return operation can be eliminated.

In addition, with the technical solution of the above described embodiments, users may be more likely to accept content obtained by a sliding action. As such, it can facilitate the content providers to selectively push content information to the users, and it can provide more technical supports for the content providers to provide customized or introductory content to the user.

Further, in some embodiments, a read-ahead mechanism may also be applied in the disclosed method. For example, the second content webpage can be a pre-read content webpage. On one hand, when a user browsers a webpage using an electronic device to which the technical solution of the above described embodiments is applied, the user may be accustomed to reading a next content webpage by performing a sliding action. As a result, the pre-read content webpages can have a higher pre-read hit ratio. On the other hand, since the pre-read content webpages can be fast loaded when the user performs a sliding action, thereby further enhancing the user experience.

Figure 2:
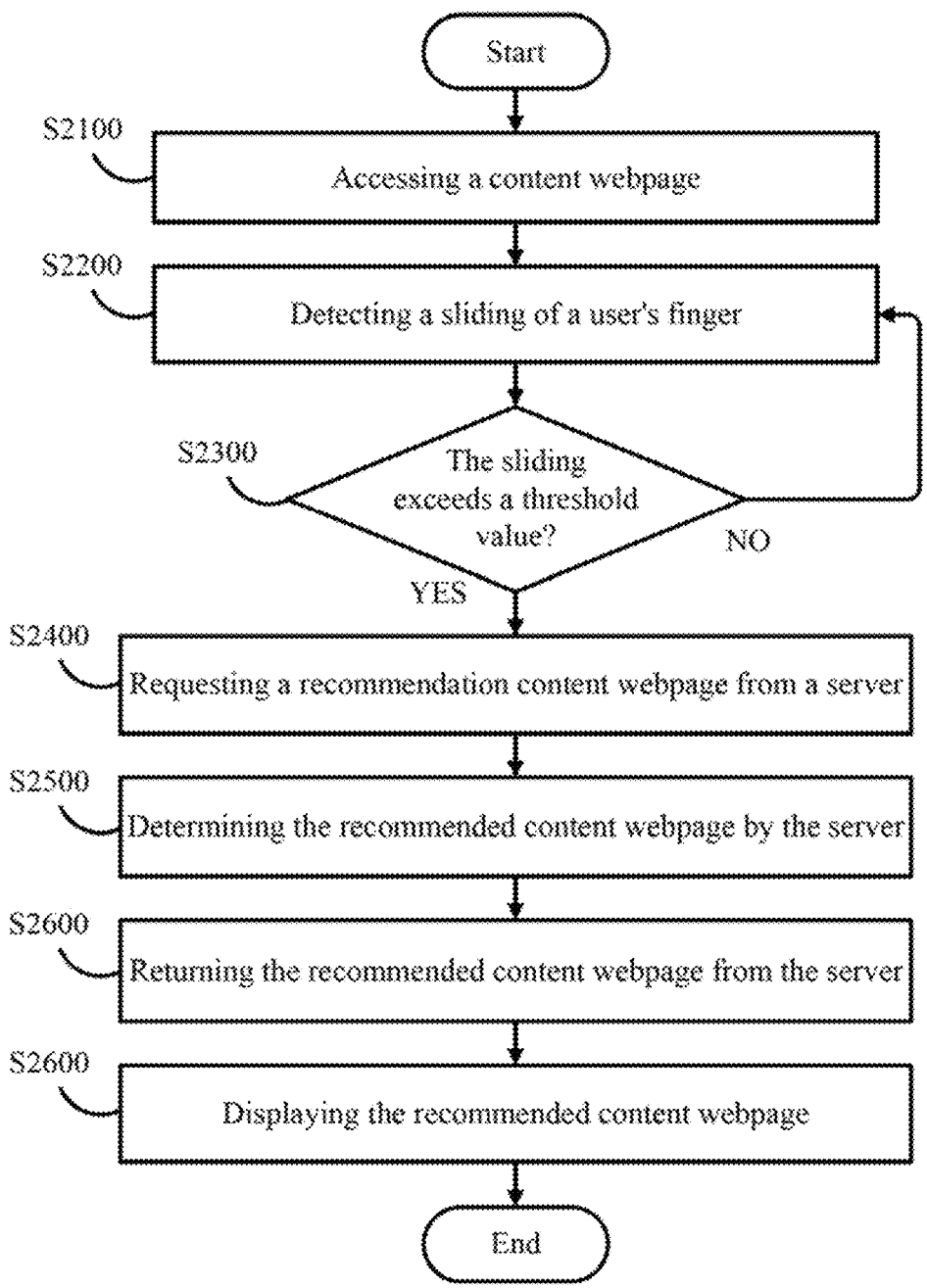
FIG. 2 illustrates a flowchart of another exemplary method for obtaining webpage content in accordance with some embodiments of the present disclosure.

Referring to FIG. 2, a flowchart of an exemplary method for obtaining webpage content is shown in accordance with some embodiments of the present disclosure. The method may be performed by an electronic device when a user starts a browser on the electronic device to prepare for browsing webpage content.

As shown in FIG. 2, at step S2100, the user can access a content webpage.

For example, the user may input a webpage address in the browser of the electronic device, such as a mobile phone, a tablet computer, etc. The content webpage corresponding to the webpage address can be displayed in the browser of the electronic device.

At step S2200, a sliding action of a user's finger or the like on a touch screen of the electronic device can be detected.

At step S2300, the electronic device can determine whether the sliding exceeds a threshold value. If the determination result is positive ("YES" at step S2300), step S2400 can be performed. Otherwise ("NO" at step S2300), the process can return to step S2200 for detecting further user's sliding actions.

The threshold value may include one or more parameters, such as a length of the user's sliding action, a speed of the user's sliding action, and a force intensity of the user's sliding action, etc.

At step S2400, a request for a recommendation content webpage can be sent to a server.

When the electronic device determines that the user's slide exceeds the threshold value, the electronic device can request the recommendation content webpage from the server. For example, a request message sent to the server may include information relating to a user's browsing webpages, such as the webpage currently browsed by the user, an operation history of the user browsing behavior, such as the frequency of the user's sliding actions for new content, and basic user information such as gender, age, and career, etc.

That is, when the electronic device determines that, for example, the length of the user's sliding action exceeds a length threshold value, the speed of the user's sliding action exceeds a speed threshold value, and/or the force intensity of the user's sliding action exceeds an intensity threshold, the electronic device may determine that the user's sliding action is intended to obtain new webpage content. Further, the electronic device may determine a server for recommendation content webpage, and send the request together with the user's corresponding information to the server.

At step S2500, based on the request and the user's corresponding information, the server can determine a recommended content webpage.

At step S2600, the server can return the recommended content webpage to the electronic device.

At step S2700, the electronic device can display the recommended content webpage in the browser. Specifically, after receiving the recommended content webpage from the server, the electronic device may display the recommendation content webpage to the user.

By using the exemplary method shown in FIG. 2, the user does not have to return to a particular node webpage after reading a content webpage to find a next content webpage when browsing the content webpages. As such, the user's browsing fluency and the user's browsing experience can be improved.

The present disclosure also provides an application for obtaining webpage content. It can be understood by those skilled in the art that, the above described methods may be embodied in products in the field of electronic technology by means of software, hardware, and a combination of software and hardware. Those skilled in the art can readily create the application for providing content webpages based on the methods disclosed above.

Figure 6:
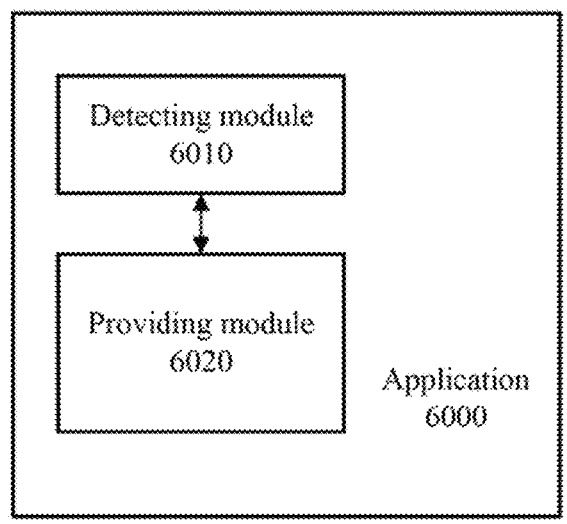
FIG. 6 illustrates a schematic block diagram of an exemplary application for obtaining webpage content in accordance with some embodiments of the present disclosure.

Referring to FIG. 6, a schematic block diagram of an exemplary application for obtaining webpage content is shown in accordance with some embodiments of the present disclosure.

As illustrated, the application 6000 can include a detecting module 6010 and a providing module 6020. The detecting module 6010 can be configured for detecting a user's sliding action when a first content webpage is displayed. The providing module 6020 can be configured for providing a second content webpage based on the detection. The second content webpage is a new content webpage obtained based on the first content webpage.

In some embodiments, the first content webpage is a news webpage.

In some embodiments, the sliding action can be a sliding action of a user tip on a screen of an electronic device. For example, the sliding action is from a left-to-right direction.

In some embodiments, the second content webpage is provided when a parameter obtained based on the detection reaches a predetermined threshold value. The parameter includes at least one of a length and a speed of the sliding action.

In some embodiments, the providing module 6020 for providing the second content webpage based on the detecting can include a first sub-component for requesting the second content webpage from a server, and a second sub-component for receiving the second content webpage from the server.

In some embodiments, the second content webpage is a news webpage.

In some other embodiments, the second content webpage is a list of news.

In some embodiments, the second content webpage is a content webpage recommended to the user. In one example, the second content page is a pre-read content webpage. In another example, the domain name of the second content webpage is different from the domain name of the first content webpage.

It should be understood by those skilled in the art that, the above-described application 6000 may be implemented in various ways. For example, the application 6000 described above may be implemented by using instructions to configure a processor. The instructions may be stored in a read only memory (ROM). The application 6000 described above may be implemented by reading instructions from the ROM into a programmable device when the programmable device is booted. As another example, the application 6000 described above may be cured into a special device, such as an application-specific integrated circuit (ASIC).

The application 6000 described above may be divided into units that are independent of each other, or may be implemented by combining the units together. The above-described application 6000 may be implemented by one of the above-described various embodiments, or may be implemented by a combination of two or more of the above-described various embodiments. Such implementations can be equivalent to those skilled in the art.

The present disclosure also provides a browser for obtaining webpage content.

The application described above for providing content webpages may be an independent application (e.g., an application in an electronic device), or may be integrated into a browser as a part of the browser. It should be understood by those skilled in the art that, as the development of the technology, a browser may be an independent application, such as an Internet Explorer browser, a Chrome browser, etc., or may be an application that integrates browser functionality, such as Weibo application, WeChat application, etc.

Figure 3:
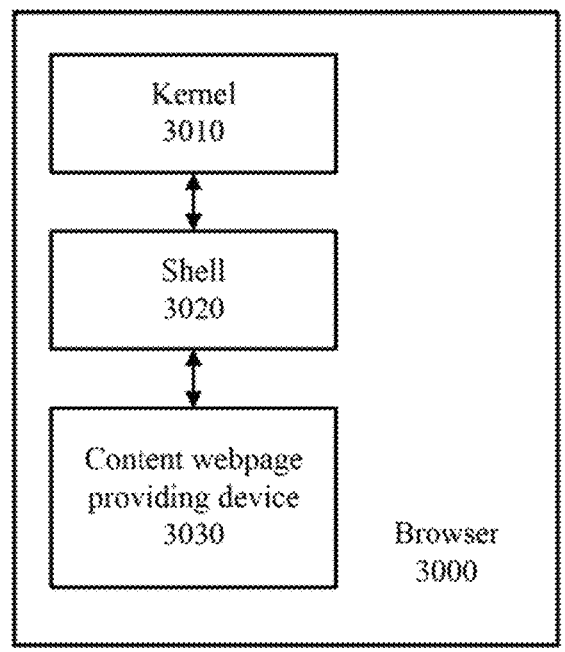
FIG. 3 illustrates a schematic block diagram of an exemplary browser in accordance with some embodiments of the present disclosure.

Referring to FIG. 3, a schematic block structural diagram of an exemplary browser is shown in accordance with some embodiments of the present disclosure.

In general, the architecture of the disclosed browser can be divided into two parts, namely a kernel and a shell. The kernel of the browser can be responsible for parsing webpages (such as HTML, JavaScript) and rendering (displaying) webpages. That is, the browser can parse and render webpages through the kernel. The shell of the browser can handle the interface appearance and the operation experience of the browser.

As illustrated in FIG. 3, the browser 3000 includes a kernel 3010 and a shell 3020. The browser 3000 also includes a content webpage providing device 3030. The content webpage providing device 3030 can be, for example, an electronic device for providing content webpages according to one embodiment of the present disclosure.

In order to providing a clear illustration, in FIG. 3, the content webpage providing device 3030 is outside of the shell 3020 and the kernel 3010. However, it should be understood by those skilled in the art that, the content webpage providing device 3030 may be located within the shell 3020 or the kernel 3010.

It should be noted that, with the development of electronic information technology including the large scale integrated circuit technology, and the trend of software to hardware, it becomes difficult to clearly delineate the boundaries of the hardware and software of the computer systems. Because any operations can be realized by either software or hardware. The execution of any instructions can be done by hardware as well as by software. For a machine function, using hardware implementation or software implementation may depend on price, speed, reliability, storage capacity, change cycle, and other non-technical factors.

Thus, it can be known to one of ordinary skill in the art of electronic information technology that, a more straightforward and clear description of a technical solution is to describe the various operations in the technical solution. Those skilled in the an can directly design the desired product based on consideration of the non-technical factors, in the case that the operations to be performed are disclosed.

Accordingly, in some embodiments, the present disclosure also provided a browser designed to perform various operations in the above described method. For example, the browser can be designed to detect a sliding action of a user when a first content webpage is displayed, and to provide a second content webpage based on the detection. The second content webpage can be a new content webpage obtained based on the first content webpage.

The present disclosure also provides an electronic device for obtaining webpage content.

Various embodiments in accordance with the present disclosure may be implemented in an electronic device, thereby enabling the electronic device to more efficiently complete the process of providing content webpages. For example, the browser 3000 can be provided in an electronic device to implement the technical solution of the present disclosure.

Figure 4:
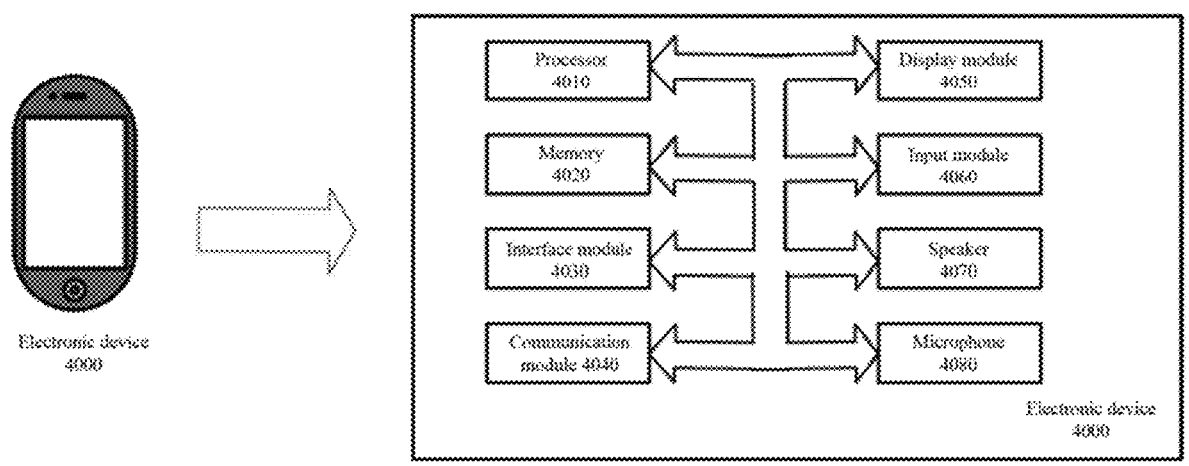
FIG. 4 illustrates a schematic hardware structural diagram of an exemplary electronic device in accordance with some embodiments of the present disclosure.

Referring to FIG. 4, a schematic hardware structural diagram of an exemplary electronic device is illustrated in accordance with some embodiments of the present disclosure. The electronic device 400 shown in FIG. 4 can be a mobile phone, a tablet computer, or any other suitable electronic device.

The electronic device 4000 can include a processor 4010, a memory 4020, an interface module 4030, a communication module 4040, a display module 4050, an input module 4060, a speaker 4070, a microphone 4080, etc.

The processor 4010 may be, for example, a central processing unit (CPU), a microprocessor (MCU), or any other suitable hardware processor. The memory 4020 may include, for example, read only memory (ROM), random access memory (RAM), nonvolatile memory such as a hard disk, etc. The interface device 4030 may include, for example, a USB interface, an earphone interface, etc.

The communication module 4040 can perform, for example, wired or wireless communication. The display module 4050 may be, for example, a liquid crystal display, a touch screen, etc. The input module 4060 may include, for example, a touch screen, a keyboard, etc. The user can input or output voice information through the speaker 4070 and the microphone 4080. The electronic device shown in FIG. 4 is only illustrative, and is not intended to limit the invention, its application, or its use.

In some embodiments, the memory 4020 can be used to store instructions for controlling the processor 4010 perform the method shown in FIG. 1 for providing content webpages. It should be understood by those skilled in the art that, although multiple modules are shown in FIG. 4, the present disclosure may relate only to some of the modules therein, such as processor 4010, memory 4020, etc. A technician can design instructions in accordance with the disclosed embodiments of the present disclosure. How to use the instructions to control the processor to operate, as being well known in the art, is not described in details herein.

Figure 5:
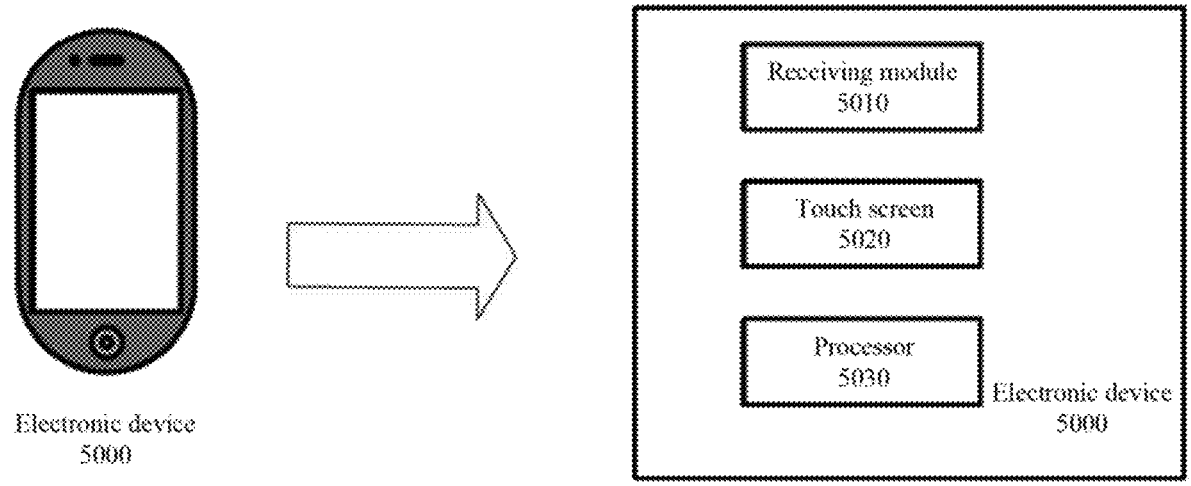
FIG. 5 illustrates a schematic hardware structural diagram of another exemplary electronic device in accordance with some other embodiments of the present disclosure.

Referring to FIG. 5, a schematic hardware structural diagram of another exemplary electronic device is shown in accordance with some other embodiments of the present disclosure.

In some embodiments, the electronic device may be a mobile phone, a tablet computer, or any other suitable electronic device. As illustrated in FIG. 5, the electronic device 5000 can include a receiving module 5010, a touch screen 5020, and a processor 5030.

The receiving module 5010 can be configured for receiving webpage data of a first content webpage from a network. The touch screen 5020 can be configured for detecting a signal of a user's finger tip touching the screen. The processor 5030 for detecting a sliding action of the user based on the signal from the touch screen when a first content webpage is displayed, and providing a second content webpage based on the detection. The second content webpage can be a new content webpage obtained based on the first content webpage.

The electronic device 5000 may further include a transmitting module for transmitting a request for the second content webpage to the server. The receiving module 5010 may further configured for receiving the second content webpage from the server.

The electronic device shown in FIG. 5 is only illustrative, and is not intended to limit the invention, its application, or its use.

In the following, the various embodiments of the present disclosure are described in a list.

EEE1: a method for providing content webpage, comprising: detecting a sliding action of a user when a first content webpage is displayed; and providing a second content webpage based on the detection, wherein the second content webpage is a new content webpage obtained based on the first content webpage.

EEE2: the method according to EEE1, wherein the first content webpage is a news webpage.

EEE3: the method according to EEE1, wherein the sliding action is a sliding on a screen of an electronic device.

EEE4: the method according to EEE1, wherein the sliding is towards a left direction.

EEE5: the method according to EEE1, wherein the second content webpage is provided when a parameter obtained based on the detection reaches a predetermined threshold value, and the parameter includes at least one of a length of the sliding action and a speed of the sliding action.

EEE6: the method according to EEE1, wherein providing the second content webpage based on the detection includes: requesting a second content webpage from a server; receiving the second content webpage from the server.

EEE7: the method according to EEE1, wherein the second content webpage is a news webpage.

EEE8: the method according to EEE1, wherein the second content webpage is a list of news.

EEE9: the method according to EEE1, wherein the second content webpage is a content webpage recommended to a user.

EEE10: the method according to EEE1, wherein the second content webpage is a pre-read content webpage.

EEE11: the method according to EEE1, wherein a domain name of the second content webpage is different from a domain name of the first content webpage.

EEE12: an application for providing content webpage, comprising: a detecting module configured for detecting a sliding action of a user when a first content webpage is displayed; and a providing module configured for providing a second content webpage based on the detection, wherein the second content webpage is a new content webpage obtained based on the first content webpage.

EEE13: the application according to EEE12, wherein the first content webpage is a news webpage.

EEE14: the application according to EEE12, wherein the sliding action is a sliding on a screen of an electronic device.

EEE15: the application according to EEE12, wherein the sliding is towards a left direction.

EEE16: the application according to EEE12, wherein the second content webpage is provided when a parameter obtained based on the detection reaches a predetermined threshold value, and the parameter includes at least one of a length of the sliding action and a speed of the sliding action.

EEE17: the application according to EEE12, wherein providing the second content webpage based on the detection includes: requesting a second content webpage from a server; receiving the second content webpage from the server.

EEE18: the application according to EEE12, wherein the second content webpage is a news webpage.

EEE19: the application according to EEE12, wherein the second content webpage is a list of news.

EEE20: the application according to EEE1, wherein the second content webpage is a content webpage recommended to a user.

EEE21: the application according to EEE12, wherein the second content webpage is a pre-read content webpage.

EEE22: the application according to EEE12, wherein a domain name of the second content webpage is different from a domain name of the first content webpage.

EEE23: a browser comprising an application according to EEE12. The browser is configured for providing a second content webpage to a user based on a first content webpage when the first content webpage is browsed by the user.

EEE24, a browser designed to perform the following operations: detecting a sliding action of a user when a first content webpage is displayed; and providing a second content webpage based on the detection, wherein the second content webpage is a new content webpage obtained based on the first content webpage.

EEE25: an electronic device, comprising a browser according to EEE23 or EEE24.

EEE26: an electronic device comprising a memory and a processor, wherein the memory is configured for storing instructions for controlling the processor to perform the method according to EEE1.

EEE27: an electronic device comprising: a receiving module configured for receiving webpage data of a first content webpage from a network; a touch screen configured for detecting a signal of a user's finger touching the screen; and a processor configured for detecting a sliding action of a user based on the signal from the touch screen when the first content webpage is displayed on the touch screen, and providing a second content webpage based on the detection, wherein the second content webpage is a new content webpage obtained based on the first content webpage.

The present disclosure can be an application, a method, and/or a computer program product. The computer program product may include a computer-readable storage medium carrying computer-readable program instructions for controlling a processor to implement various aspects of the present disclosure.

The computer-readable storage medium may be a tangible device that can keep and store instructions used by an instruction execution device. For example, the computer-readable storage medium may be, but not limited to, an electrical storage device, a magnetic storage device, an optical storage device, an electromagnetic storage device, a semiconductor storage device, or any suitable combinations thereof. More specific examples (non-exhaustive lists) of computer readable storage media include portable computer disk, hard disk, random access memory (RAM), read only memory (ROM), erasable programmable read only memory (EPROM), flash memory, static random access memory (SRAM), portable compact disk read only memory (CD-ROM), digital versatile disk (DVD), memory stick, floppy disk, mechanical encoding device, orifice or recessed raised structures storing instructions, and any suitable combination thereof. The computer readable storage medium used herein is not interpreted as an instantaneous signal itself, such as radio waves or other freely propagating electromagnetic waves, electromagnetic waves propagating through waveguides or other transmission media (e.g., optical pulses through fiber optic cables), or electrical signals transmitted by wires, etc.

The computer readable program instructions described herein may be downloaded from the computer-readable storage medium to computing/processing devices respectively, or be downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device can receive computer-readable program instructions from the network, and can transmit the computer-readable program instructions for storage in the computer-readable storage medium in each computing/processing device.

The computer program instructions for performing the operations of the present disclosure may be assembly instructions, instruction set architecture (ISA) instructions, machine instructions, machine related instructions, microcode, firmware instructions, state setting data, source codes or object codes written in any combination of one or more programming languages. The programming languages includes object-oriented programming languages, such as Smalltalk, C++, etc., as well as conventional procedural programming languages, such as C and similar programming languages. The computer-readable program instructions may be executed entirely on a user's computer, be executed partially on a user's computer, be executed as a standalone software package, be executed partially on a user's computer and on a remote computer, or be executed entirely on a remote computer or server carried out. When a remote computer is involved, the remote computer may be connected to the user's computer through any suitable network, including a local area network (LAN) or a wide area network (WAN), or may be connected to an external computer (e.g., using an Internet service provider via the Internet connection). In some embodiments, a personalized electronic circuit, such as a programmable logic circuit, a field programmable gate array (FPGA), or a programmable logic array (PLA), can be customized by utilizing state information of the computer-readable program instructions, to execute the computer-readable program instructions to implement various aspects of the present disclosure.

The various aspects of the present disclosure are described herein with reference to flowcharts and/or block diagrams of methods, system, and computer program product according to some embodiments. It should be understood that, each block of the flowcharts and/or block diagrams, and combinations of blocks in flowcharts and/or block diagrams, may be implemented by computer-readable program instructions.

The computer-readable program instructions may be provided to one or more processors of general purpose computers, special purpose computers, or other programmable data processing applications. As such, a machine can be produced such that when executed by the processors of computers or other programmable data processing applications, the functions/operations specified in one or more blocks in the flowcharts and/or block diagrams can be implemented. The computer-readable program instructions may also be stored in a computer-readable storage medium, such that the computers, programmable data processing apparatus, and/or other devices can operate in a particular manner. As such, the computer-readable medium having stored the instructions therein can include a manufacture that includes the instructions to implement various aspects of the functions/operations specified in one or more blocks of the flowcharts and/or blocks diagram.

The computer-readable program instructions may also be loaded onto a computer, a programmable data processing apparatus, or other device, such that a series of operational steps can be performed on the computer, the programmable data processing apparatus, or other device to produce a computer-implemented process. As such, the instructions executed on the computer, the other programmable data processing device, or the other device can implement the functions/operations specified in one or more blocks of the flowcharts and/or block diagrams.

The flowcharts and block diagrams in the figures show the architecture, functionality, and operations of possible implementations of systems, methods, and computer program products in accordance with various embodiments of the present disclosure. In this regard, each block in the flowcharts or block diagrams may represent a module, a program block, or a portion of an instruction. The module, the program block, or the portion of the instruction can contain one or more executable instructions for implementing specified logic functions. In some alternative implementations, the functions noted in the blocks may also be implemented in an order different from that indicated in the figures. For example, two consecutive blocks may in fact be executed substantially in parallel, or may sometimes be executed in reverse order, depending on the function involved. It should also be noted that, each block in the block diagrams and/or flowcharts, and combinations of blocks in the block diagrams and/or flowcharts, may be implemented with a special hardware-based system that performs the specified functions or operations, or may be implemented using a combination of special hardware and computer instructions. It is well known to those skilled in the art that the implementations achieved by hardware, by software, and by a combination of software and hardware are equivalent.

The embodiments of the present disclosure described above are only exemplary but not exhaustive, and are not intend to limit the present disclosure. Various modifications and variations can be apparent to those skilled in the art without departing from the scope and spirit of the illustrated embodiments. The choices of the terms used herein are intended to desirably explain the principles of the embodiments, practical applications, or technical improvements to the technology in the market, or to enable others of ordinary skill in the art to understand the embodiments disclosed herein. The scope of the invention is defined by the following claims.

What is claimed is:

1. A method for providing content webpage, comprising:
   detecting a sliding action of a user on an electronic device when a first content webpage is displayed; and
   providing a second content webpage displayed in a suspended window based on the detection, without returning to a node webpage of a portal website, to which both the first content webpage and a list of content webpages including the second content webpage are related, wherein the suspended window provides the list of content webpages including the second content webpage, wherein:
   the second content webpage is provided when a parameter obtained based on the detection reaches a predetermined threshold value, the predetermined threshold value being pre-determined by at least using statistical data of browsing habits of the user, the browsing habits including reading a new content webpage by performing a sliding action;
   when the parameter obtained based on the detection reaches the predetermined threshold value, requesting the second content webpage from a server, the second content webpage: i.) is a new content webpage recommended by the server, ii.) is pre-stored in the electronic device, and iii) having an increased pre-read hit ratio when the first content webpage is displayed.

2. The method according to claim 1, wherein:
   the list of content webpages, including the second content webpage includes a list of news recommended to the user.

3. The method according to claim 1, wherein the sliding action is a sliding on a screen of the electronic device towards a left direction.

4. The method according to claim 1, wherein the parameter includes a path length of the sliding action.

5. The method according to claim 1, wherein the parameter includes and a speed of the sliding action.

6. The method according to claim 1, wherein providing the second content webpage based on the detection includes:
   requesting the second content webpage from the server; and
   receiving the second content webpage from the server.

7. The method according to claim 1, wherein a domain name of the second content webpage is different from a domain name of the first content webpage.

8. The method according to claim 1, wherein the electronic device comprising a memory and a processor, the processor being configured for storing instructions for controlling the processor.

9. The method according to claim 1, further including:
   when the parameter obtained based on the detection exceeds the predetermined threshold value, requesting the second content webpage from the server,
   wherein the requesting includes information of a currently-browsed webpage by the user, and an operation history of the browsing behaviors including a frequency of the user's sliding actions for new content.

10. The method according to claim 1, wherein:
    the predetermined threshold value is dynamically adjusted corresponding to browsing behaviors of the user for different types of webpages.

11. A non-transitory computer storage medium containing program instructions for, when executed by a processor, performing a method for providing content webpage, the method comprising:
    detecting a sliding action of a user when a first content webpage is displayed; and
    providing a second content webpage displayed in a suspended window based on the detection, without returning to a node webpage of a portal website, to which both the first content webpage and a list of content webpages including the second content webpage are related, wherein the suspended window provides the list of content webpages including the second content webpage, wherein:
    the second content webpage is provided when a parameter obtained based on the detection reaches a predetermined threshold value, the predetermined threshold value being pre-determined by at least using statistical data of browsing habits of the user, the browsing habits including reading a new content webpage by performing a sliding action; and
    when the parameter obtained based on the detection reaches the predetermined threshold value, requesting the second content webpage from a server, the second content webpage: i.) is a new content webpage recommended by the server, ii.) is pre-stored in an electronic device, and iii) having an increased pre-read hit ratio when the first content webpage is displayed.

12. The non-transitory computer storage medium according to claim 11, wherein:
    the list of content webpages, including the second content webpage includes a list of news recommended to the user.

13. The non-transitory computer storage medium according to claim 11, wherein the sliding action is a sliding on a screen of the electronic device towards a left direction.

14. The non-transitory computer storage medium according to claim 11, wherein:
the parameter includes at least one of a path length of the sliding action and a speed of the sliding action.

15. The non-transitory computer storage medium according to claim 11, wherein a domain name of the second content webpage is different from a domain name of the first content webpage.

16. The non-transitory computer storage medium according to claim 11, further comprising a browser.

17. An electronic device, comprising:
a touch screen configured to detect a signal of sliding on the touch screen; and
a processor configured to:
receive webpage data of a first content webpage from a network,
detect a sliding action of a user based on the signal from the touch screen when the first content webpage is displayed on the touch screen, and
providing a second content webpage displayed in a suspended window based on the detection, without returning to a node webpage of a portal website, to which both the first content webpage and a list of content webpages including the second content webpage are related, wherein the suspended window provides the list of content webpages including the second content webpage, wherein:
the second content webpage is provided when a parameter obtained based on the detection reaches a predetermined threshold value, the predetermined threshold value being pre-determined by at least using statistical data of browsing habits of the user, the browsing habits including reading a new content webpage by performing a sliding action, and
when the parameter obtained based on the detection reaches the predetermined threshold value, requesting the second content webpage from a server, the second content webpage: i.) is a new content webpage recommended by the server, ii.) is pre-stored in the electronic device, and iii) having an increased pre-read hit ratio when the first content webpage is displayed.

18. The electronic device according to claim 17, wherein:
the sliding action is towards a left direction;
the second content webpage is provided when a parameter obtained based on the detection reaches a predetermined threshold value; and
the parameter includes at least one of a path length of the sliding action and a speed of the sliding action.

19. The electronic device according to claim 17, wherein a domain name of the second content webpage is different from a domain name of the first content webpage.

* * * * *